July 16, 1957 E. HELLIER 2,799,300
HOT BEVERAGE DISPENSER
Filed June 6, 1955 5 Sheets-Sheet 1

INVENTOR.
EDWARD HELLIER
BY Arthur Robert
ATTORNEY

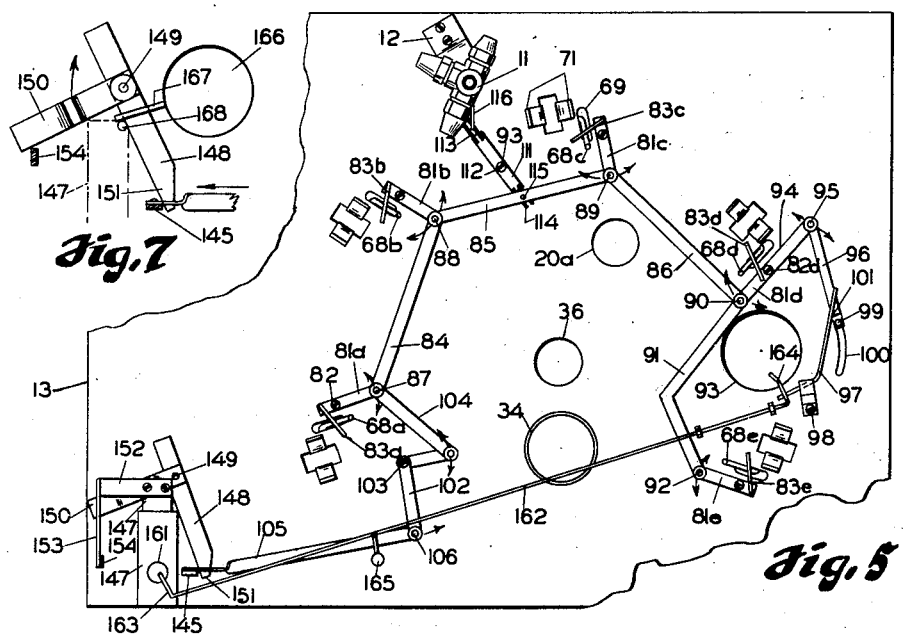
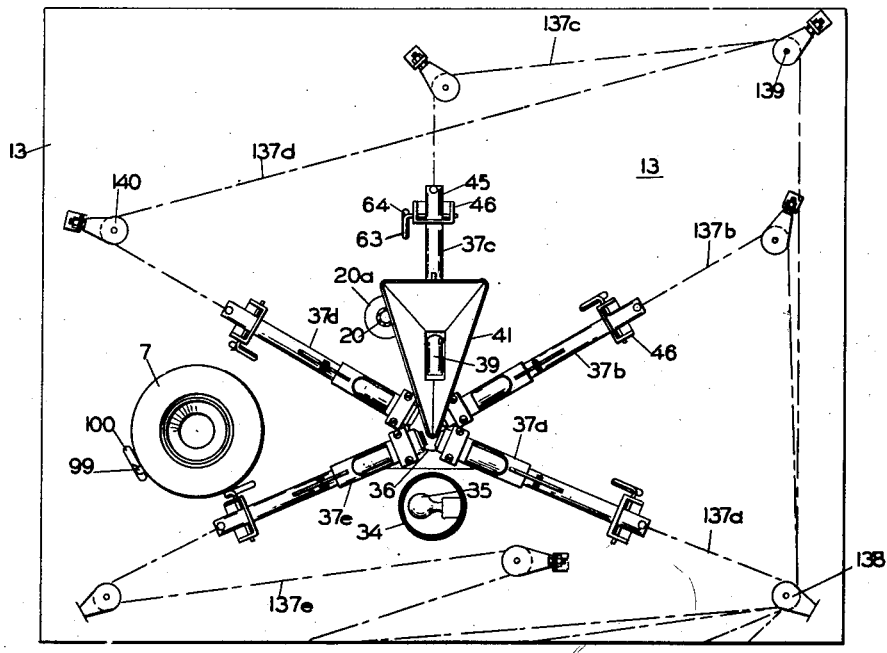

July 16, 1957  E. HELLIER  2,799,300
HOT BEVERAGE DISPENSER
Filed June 6, 1955  5 Sheets-Sheet 3
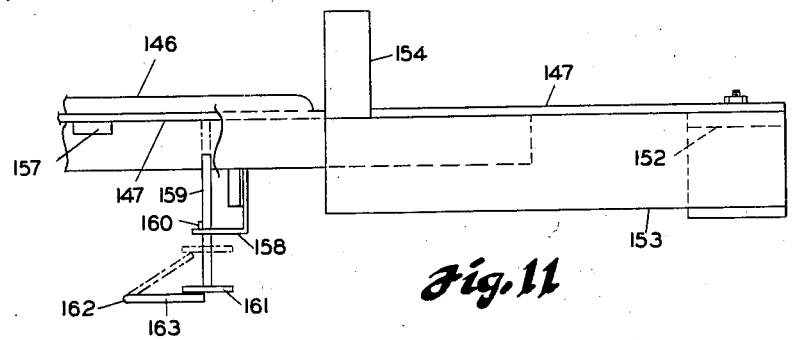
Fig. 11
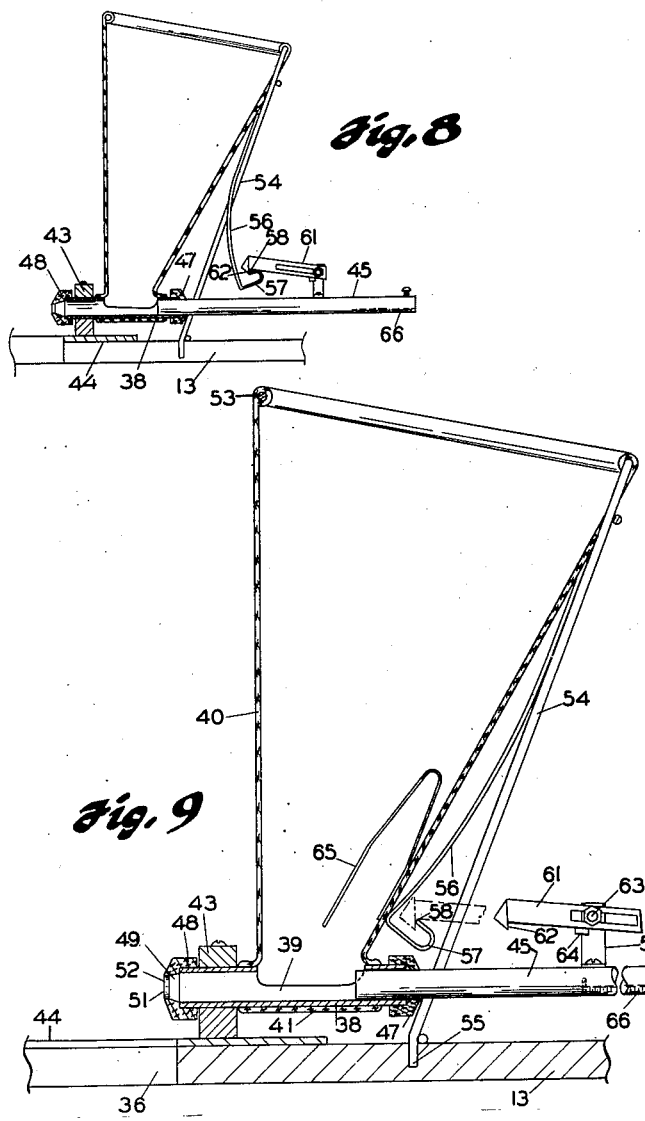
Fig. 8
Fig. 9
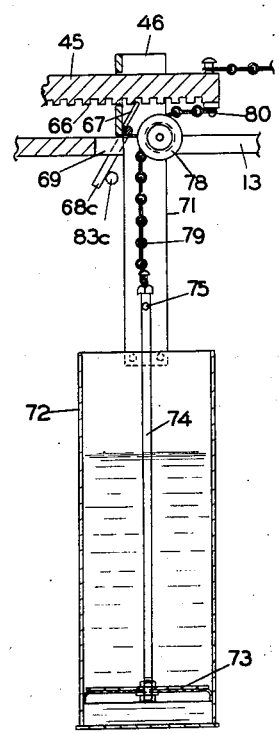
Fig. 10
INVENTOR.
EDWARD HELLIER
BY Arthur Robert
ATTORNEY July 16, 1957  E. HELLIER  2,799,300
HOT BEVERAGE DISPENSER
Filed June 6, 1955  5 Sheets-Sheet 4
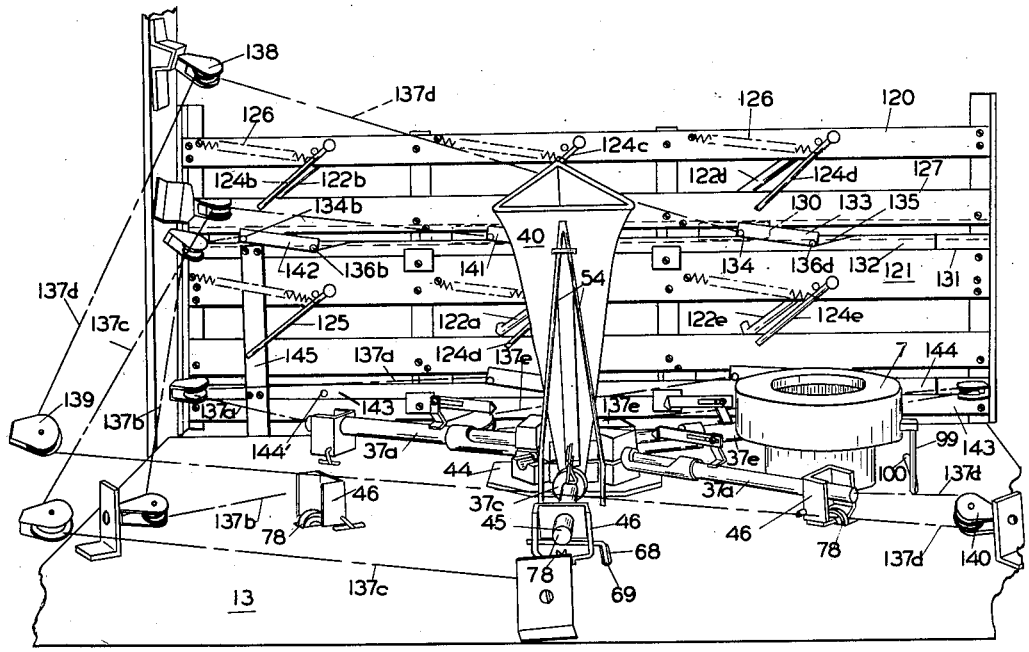
*Fig. 12*
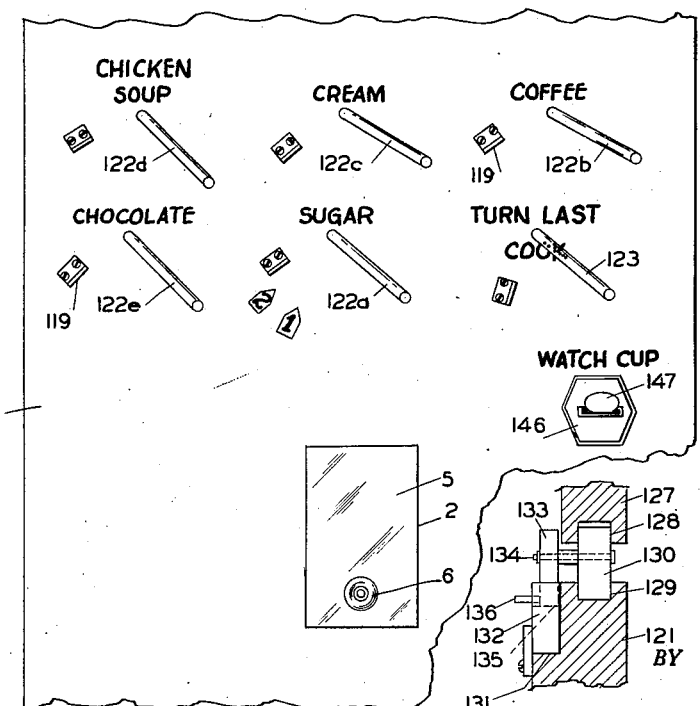
*Fig. 13*
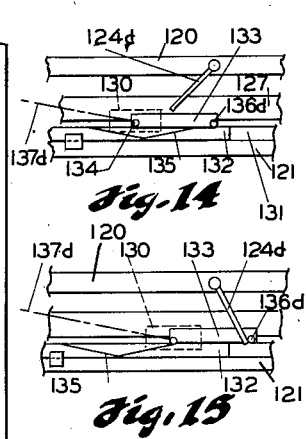
*Fig. 14*
*Fig. 15*
*Fig. 16*
INVENTOR.
EDWARD HELLIER
BY Arthur Robert
ATTORNEY July 16, 1957 E. HELLIER 2,799,300
HOT BEVERAGE DISPENSER
Filed June 6, 1955 5 Sheets-Sheet 5

INVENTOR.
EDWARD HELLIER
BY Arthur Robert
ATTORNEY

United States Patent Office 2,799,300
Patented July 16, 1957

2,799,300

HOT BEVERAGE DISPENSER

Edward Hellier, Louisville, Ky.

Application June 6, 1955, Serial No. 513,179

23 Claims. (Cl. 141—104)

The present invention relates to an apparatus for dispensing beverages, and relates in particular to an apparatus for automatically mixing powder concentrate with hot water to produce hot beverages A significant object of my invention is to provide an improved apparatus for mixing hot water and a readily dispensible powdered beverage ingredient in a mixing cup serving as the container of the beverage, and without requiring mixing before entry into the cup.

A further object is to provide an improved apparatus for mixing hot water with a selected one or more of a variety of powdered beverage ingredients in a mixing cup serving as a container for the beverage and effecting an improved mixing in the cup by dropping unagglomerated powder from a substantial height into the water in the cup, and during further addition of water thereto.

Another object of the present invention is to provide a manually operated dispensing apparatus for mixing predetermined amounts of powdered concentrate and hot water to produce a hot beverage.

A further object is to provision of an improved mechanism for dispensing a predetermined quantity of hot water.

A further object is the provision of a manually operated beverage dispensing device wherein the operator may select or choose the kind of beverage desired.

Still another object is the provision of a hot beverage dispensing device employing powder concentrates, in which caking or agglomeration of the powders is eliminated.

Another object is the provision of a hot beverage dispensing cabinet in which water vapor is effectively eliminated from the interior.

A further object is the provision of a hot water dispensing apparatus maintained at atmospheric pressure.

A further object is the provision of an apparatus for dispensing hot beverages in which a substantially constant or uniform volume is dispensed even after the machine has been inactive a long time.

Another object is the provision of a hot water dispensing apparatus in which expansion of the water volume by heat does not cause continual drippage.

Still another object is the provision of a hot beverage dispensing device in which the timing of the water and powder discharge promotes mixing in the cup.

The invention is described in detail in the following specification taken in connection with the accompanying drawings illustrating a preferred embodiment by way of example, and wherein:

Figure 5 is a bottom view of the control linkage mounted on the bottom of the middle partition;

Figure 6 is a plan view of the powder dispensing mechanism mounted on the top of the middle partition, with parts removed;

Figure 7 is an enlarged view of a detail of Figure 5;

Figure 8 is a vertical sectional view of a powder dispenser;

Figure 9 is an enlarged view similar to Figure 8, showing the powder dispenser in a different position;

Figure 10 is a vertical sectional view of an actuating mechanism for the powder dispenser;

Figure 11 is a partly diagrammatic view of a coin control mechanism;

Figure 12 is a perspective view of the powder dispensing mechanism and selector mechanism as seen from the rear, the housing being removed;

Figure 13 is a front elevation of a portion of the cabinet shown on an enlarged scale;

Figures 14 and 15 are enlarged views of part of the selector mechanism;

Figure 16 is a sectional view of a detail;

*Hot water dispenser*

Figure 1:
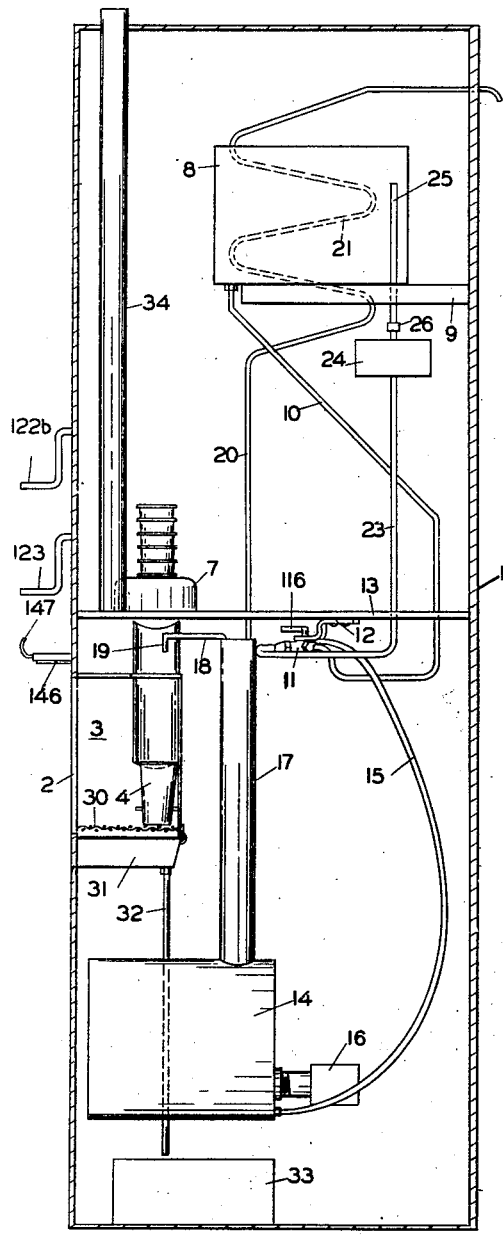
Figure 1 is an elevation view of the apparatus with the housing in section and certain parts being omitted.

Referring to the drawing, Figure 1, there is shown a cabinet 1 housing the dispensing mechanism, this cabinet having an opening 2 in the front to a chamber 3 for holding a cup 4 for receiving the beverage to be dispensed. This opening may be closed by a sliding door 5 (Fig. 13) having a knob 6. The cup is dispensed from a conventional type cup dispenser 7 as will be described hereafter in more detail. A cold water supply tank 8 is positioned on a shelf 9 in the cabinet near the top, and a pipe 10 leads from any suitable point of the tank to a three-way valve 11 attached by a bracket 12 to a partition 13, located about midway of the height of the cabinet. A normally filled hot water storage tank 14 near the bottom of the cabinet is connected by a pipe 15 with the three-way valve 11, the water in tank 14 being kept hot by a conventional type electrically operated thermostat-controlled heater 16. An extension 17 of the hot water tank has an overflow pipe 18 turned down at 19 so that, a controlled amount of hot water overflow, regulated as hereinafter described, flows into the cup 4. A vented standpipe or surge chamber 20 of any suitable diameter leads from the top of extension 17 through an opening 20a (Fig. 6) in partition 13 to a condenser coil 21, vented to the outside of the cabinet. Condensate forming in coil 21 is thus returned to hot water tank 14 and serves to maintain the water level constant therein. Moreover, when water containing minerals is used in the apparatus, the taste of such water might vary, due to removal of the distillate, were means not provided for returning the same to the tank 14. Thus, coil 21 further serves to hold the mineral content of such water at its normal value and to avoid undesired changes in the taste of the beverage produced. The standpipe preferably is insulated for some distance above the extension 17 (not shown).

As shown diagrammatically in Figure 2, in one position of valve 11, the valve plug 22 connects pipe 10 and tank 8 to measuring pipe 23, which joins to a measuring chamber 24, this chamber preferably being positioned below the bottom of tank 8 and above overflow pipe 18. A vent pipe 25 of small diameter, open at the top and having a check valve 26 therein, connects to measuring chamber 24 and terminates at or above the highest levels of liquid in tank 8. In the position of the three-way valve shown in Figure 2, water will flow from tank 8 into measuring chamber 24 and will find its level in vent pipe 25. When the valve plug 22 is turned to the position shown in Figure 3, pipe 10 is closed off, and the water in measuring tank 24 will flow by pipe 23 through the valve and pipe 15 to the hot water tank 14, thereby causing an overflow through pipe 18.

Figures 2, 3:
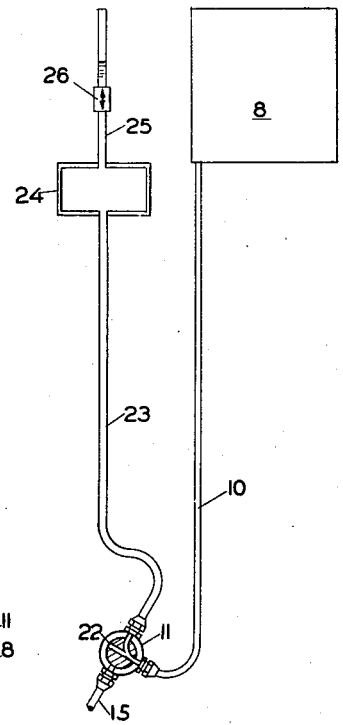
Figure 2 is a partly diagrammatic view of the water measuring mechanism.
Figure 3 is diagrammatic view of the control valve in a different position than in Figure 2.
Figure 4:
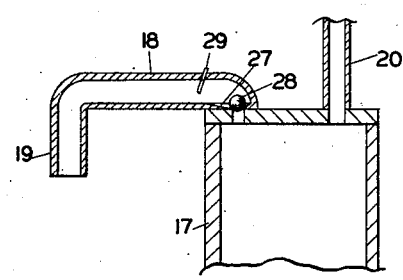
Figure 4 is a fragmentary sectional view of the overflow mechanism.

Referring to Figure 4, it will be seen that the overflow pipe 18 of the hot water tank extension 17 has a ball valve seat with a sloping approach 27 that tends to return the ball 28 to its seat by gravity, and unseating movement of the ball is limited by a pin 29 extending through the overflow pipe 18. Preferably, the standpipe 20 enters extension 17 at about the same elevation as overflow pipe 18. When the valve plug 22 is turned to the position shown in Figure 3, the flow of cold water from tank 24 to the bottom of the hot water tank 14 causes a rise of water in standpipe 20 sufficient to produce a static head to unseat the valve 28, and thus allow overflow of an equal amount of hot water through overflow pipe into the cup 4. A predetermined head of water is required to unseat the valve, and once unseated, the flow velocity supplements the static water head to keep the valve unseated. When the velocity head drops enough, the ball rolls down the incline 27 and seats, thus stopping further water flow. When the water in tank 14 expands by reason of it being heated, the tube 20 accommodates the increase in volume until a sufficient static head develops to open valve 28. After this extra volume has ben discharged, the valve 28 will close. Thus, expansion is provided for by a relatively large intermittent overflow, rather than continuous drippage from spout 19, which results in less water vapor in the housing. Any spillage or drip passes through foraminous grid 30 into pan 31 and flows by pipe 32 to a suitable waste receptacle 33.

The pipe 23 and measuring chamber 24 hold a predetermined amount of water, and as the water seeks its level in pipe 25, the head of water in this pipe will vary, depending on the water level in tank 8. However, by making pipe 25 of small diameter, its variation in volume at different heads is kept within allowable limits, so the amount of water discharged into cup 4 at each operation is of sufficiently uniform volume. The check valve 26 acts as an air bleed and also serves to prevent the water spurting out the open end of pipe 26 and allows free flow from the measuring chamber to tank 14. If desired, tank 8 may be connected to a city water supply, in which case it will contain a constant level mechanism of any conventional type.

*Ventilator*

A stack 34 extends through partition 13 and through the top of the cabinet. This stack contains a heater 35 (Fig. 6), preferably in the form of an electric lamp, so as to induce an updraft, the stack serving to discharge water vapor or moist air from the interior of the cabinet. This heater preferably is not operated continuously, but is actuated for a short period by a coin-controlled mechanism, as will be later described. As will be apparent, light from lamp 35 passes downwardly through the lower end of stack 34 into chamber 3 and serves to illuminate the space surrounding mixing cup 4 and opening 2 in the front of the cabinet during the dispensing operation.

*Powder dispensers*

Figure 18:
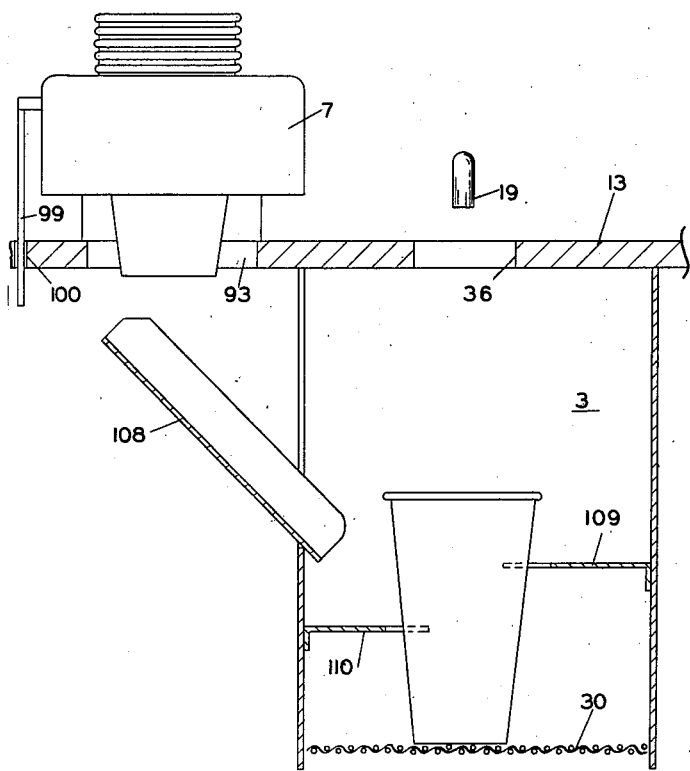
Figure 18 is a sectional view of the cup positioning mechanism.

Referring to Figure 6, above the cup 4 the middle partition 13 has an opening 36 through which powdered material is dropped into the cup. As best seen in Fig. 18, opening 36 is a substantial distance above the mixing cup and since the powdered ingredient of the beverage is in a flocculent, unagglomerated state, as will later become apparent, it therefore is substantially dispersed as it falls upon the surface of the water in the cup and accordingly is readily mixed with the hot water which continues to fall into the cup during the dropping of the powder into that same mixing cup. A plurality of powder dispensing or measuring devices 37a, 37b, 37c, 37d and 37e are arranged around this opening, and as they are all alike, only one (37c) will be described in detail. It will be understood, however, that each measuring device dispenses a different kind of powder.

Referring to Figure 9, the measuring device comprises a cylinder 38 cut away at the top as indicated at 39, and a bag 40 serving as a resrvoir, has a bottom sleeve 41 which receives cylinder 38 to supply powder to the cylinder through opening 39. As shown, this bag, which preferably is made of suitable pliable material, is of generally inverted pyramidal shape, and at its bottom forms the stocking or sleeve 41 to receive the measuring cylinder 38. The powder materials used in the bag have a tendency to cake, and by providing a flexible wall container, the cakes can be broken up by kneading the bag, when the machine is serviced.

This cylinder is suitably mounted in a split block 43 attached to a plate 44 secured on partition 13 and having a hole registering with the opening 36. A long piston or plunger 45 is loosely mounted to reciprocate in cylinder 38, the opposite end being guided by a bracket 46 (Figs. 10 and 6). At one end a seal is provided between the plunger end and cylinder by a cup-shaped packing member 47 which fits the plunger with a wiping fit. At the forward end of the cylinder is located another packing member 48 which provides a taper aperture 49 ending in an opening 51 having a wiping fit with the plunger. The face 52 of the packing may be sloped somewhat. It will be seen that when the plunger moves forward (to the left as seen in Figure 9) it pushes a charge of powder ahead of it, and the powder is discharged at opening 51 and falls through hole 36 into the mixing cup. Since flow of hot water into the mixing cup is initiated at the time the plunger starts to move forward, as will later become apparent, and since the plunger must move an appreciable distance before the powder charge is pushed through opening 51; it follows that there will be a small amount of hot water in the mixing cup when the first portion of the powder charge falls into the cup, thus permitting the powder to "flock" or disperse upon the surface of a turbulent mass of hot water. As the piston moves forward, it engages the tapered aperture 49 which guides the end of the piston into opening 51, so any powder adhering to the cylindrical piston surface is wiped off by the packing member 48. On the retraction stroke, the packing member 47, wipes off adhering powder from the piston surface.

*Powder agitator*

The bag 40 has a wire frame 53 about its top to which are secured the divergent rods 54 (Figs. 9 and 12). These rods have suitable stops and are set in suitable holes 55 in the partition 13 to support the bag, and they straddle the dispenser 37c. A leaf spring 56 is attached to the rods 54 near the top, and extends downwardly along the surface of the bag, terminating in an open bight 57 with an end 58. A bracket 59 on plunger 45 carries a slotted arm 61 ending in a hook or pawl 62, the arm being pivoted on a pivot pin 63 and resting on a stop 64 on bracket 59. When plunger 45 is at the left or discharge position, the hook 62 engages end 58 of the spring, as shown in dot and dash lines in Figure 9. That is, when the piston moves to the left, the point of hook 62 rides up on bight 57 until the point drops over end 58, this motion being allowed by the pivot pin 63. The stop 64 prevents the arm 61 from dropping too low.

When the plunger 45 is retracted to the right the pivot pin 63 engages the right end of the slot in arm 61, thus pulling arm 61 to the right, and the engagement of hook 62 with end 58 of the spring, flexes the spring as shown in Figure 8. Upon continued motion of the plunger 45 to the right, the bight 57 engages arm 61 to raise this arm and thus disengage the hook 62 from the spring. When this disengagement occurs the spring retracts and slaps the bag 40 to break up any bridging of the powder therein. In addition, the bag carries a plurality of spring wires 65 on the interior so that, when the bag is agitated by the striker spring 56, these wires also agitate the powder. The powder thus is able to fall through opening 39 in the measuring cylinder 38. The position at which disengagement of pawl 62 with end 58 occurs can be adjusted by changing the angle the bight 57 makes with the leaf spring.

*Powder dispenser actuator*

Figure 17:
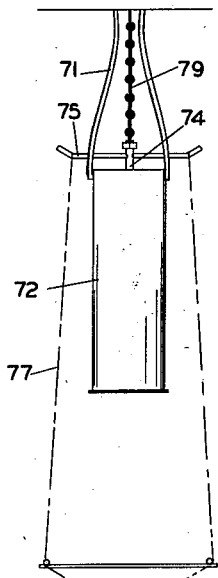
Figure 17 is an elevational view of a detail.

The underside of plunger 45 carries a rack 66 (Fig. 10) and a horizontally pivoted detent or pawl 67, journalled in bracket 46, engages this rack. The detent 67 has a downward bent rod or tail 68c which passes through a slot 69 in partition 13. The detent tail is of sufficient length and weight to cause the top portion 67 normally to engage with rack 66 and to prevent undesired movement of the plunger 45 to the left, but permitting free movement thereof to the right. However, the detent 67 may be removed from locking engagement with the rack by causing locking pin 83c to engage the detent tail and to pivot the detent in the manner later to be described. The bracket 46 is extended beneath the partition 13 to provide a bracket 71 (Figs. 10 and 17) that carries a cylinder 72 which may contain a suitable fluid. A piston 73 in the cylinder has a rod 74 extending upwardly therefrom. Piston 73 has suitable adjustable bleed openings therein (not shown) which allow transfer of liquid from one side of the piston to the other. A cross rod or yoke 75 attached to the piston carries a weighted bottle 76 by means of chains 77. The bottle 76 can be accurately weighted by sand, water, or the like. A pulley 78 is suitably journalled for free rotation in bracket 46, and a chain 79 has one end attached to the end of rod 74. The chain passes through a suitable hole in partition 13, around the pulley, and its other end is attached to the end of plunger 45 at 80.

Figure 10 shows the plunger 45 in its left hand, or normally inoperative position. When plunger 45 is retracted to the right, as will presently be explained, as seen in Figures 8 and 9, it acts through the chain 79 to raise piston 73. When the plunger 45 is released, the pawl 67 prevents the weight 76 from returning the plunger. However, when the pawl is released, the weighted bottle 76 causes the piston 73 to slowly descend in cylinder 72 as liquid leaks through the bleed openings to the other side of the piston. As the piston 73 descends, it acts through chain 79 to move the plunger 45 forward (to the left) to discharge a measured amount of powder from the measuring cylinder 38, which drops through hole 36 into cup 4. For convenience, the detent tails of the various powder dispensers are indicated separately in Figure 5 as 68a, 68b, 68c, 68d, and 68e, although they are all alike and act similarly on the respective dispensing plungers.

As best shown in Fig. 5, the detent locking and release mechanism is connected to a movable linkage adapted to be manually actuated in dependence upon a coin control mechanism later to be described. In general, this linkage includes a link 105 attached at 106 to one end of bell crank 102, which at 103 is pivotally supported from partition 13. The other end of the bell crank is attached to one end of link 104 which, in turn, has its other end attached at 87 to arm 81a and link 84. Link 84, in turn, is attached to link 85 which, in turn, is attached to link 86. Link 86 is attached to both arm 81d with an extension 94 thereon and to a dogleg link 91 to which is attached arm 81e.

Detent actuating arms 81a 81b, 81c, 81d and 81e are each pivotally mounted at their intermediate points upon partition 13 and at their extreme ends carry transverse locking pins 83a to 83e, respectively, for engagement with detent tails 68a to 68e, respectively. Movement of link 105 to the right, as viewed in Fig. 5, after the operator has made his choice of beverage and has filled the appropriate ingredient measuring chambers therefore causes each of the locking pins 83a to 83e to engage with their associated detent tails, pivoting the same about their mountings and permitting the selected plungers to move toward discharge positions. It will be seen that in Fig. 5, however, the linkage is positioned in a normal condition in which the detent tails are hanging downwardly by gravity and with the transverse locking pins out of engagement with these detent tails.

*Cup dispenser and guide chute*

It will be noted that the dogleg link 91 is pivoted at 90 to link 86, and is pivoted at 92 to arm 81e. The dogleg extends around opening 93 through which the cup dispenser drops the cup. Arm 81d is pivoted at 82d, and an extension 94 on arm 81d is pivoted at 95 to an arm 96. This arm carries a stiff bent wire 97 that is guided for transverse sliding movement in a clip 98. An actuating pin 99 (Figs. 5, 6 and 12) for operating the cup dispenser 7 extends through the arcuate slot 100 in partition 13 and is positioned to be engaged by the end 101 of arm 96. Thus, when arm 96 moves downward as seen in Fig. 5, it actuates the cup dispenser to drop a cup through opening 93, and the cup is guided to chamber 3, as will presently appear.

From the description so far pursued, it will be seen that when link 105 is moved to the left as seen in Figure 5, it turns bell crank 102 clockwise, and through links 104, 84, 85, and 86 rotates extension 94 around the pivot 82d to cause arm 96 to move actuating pin 99 so as to drop a cup through opening 93. Referring to Figure 18, when a cup is dropped by the cup dispenser, the cup falls into chute 108 which guides it into compartment 3. In this compartment are located positioning baffles 109, 110, which locate the cup in upright position under powder dispensing opening 36.

*Water valve actuator*

Referring to Figure 5, a lever 111, pivoted at 112 has forked ends 113 and 114, one end 114 receiving an actuating pin 115 in link 85, and the other end 113 receiving an actuating crank 116 for operating valve 11. Thus, it will be seen that when by operation of link 105 the pawls of the powder dispensing plungers are unlocked, and a cup is dropped, the movement of link 85 and pin 115 turn valve 11 from the position shown in Figure 3, to the position shown in Figure 2, to allow water to enter the measuring chamber 24.

*Manual beverage selector*

Referring to Figures 12 and 13, the front of the machine carries horizontal bars 120 and 121 in which the cranks 122a, 122b, 122c, 122d, 122e and 123 are swivelled, these cranks being extended through the front panel of the machine. The cranks 122a to 122e are designated for dispensing sugar, coffee, cream, soup and chocolate, but any other type of powder desired may be dispensed. A stop 119 is positioned adjacent each crank to limit its rotation in one direction. All the cranks are alike, and on the inside the powder dispensing cranks each have an operating pin or rod 124a to 124e respectively attached thereto. The crank 123 has a similar operating rod 125 thereon. Each crank is held in inoperative position by springs 126. As will be apparent, the stops 119 may be made adjustable in order to vary the quantity of material dispensed, or the setting of the several operating pins or rods may be adjusted for the same purpose.

Between bars 120 and 121 is a rail 127 grooved on its under edge at 128, as shown in Figure 16. The upper edge of bar 121 is similarly grooved at 129, and a shoe or slide 130 is positioned between the grooves. The bar 121 is rabbeted at 131 and carries a slide bar 132 in the recess thus formed. A latch bar 133 is pivoted to the shoe 130 by a pin 134. It will be seen the slide bar 132 has a wide V-shaped notch 135 in its upper edge and in the position shown in Figure 12 the latch bar 133 is received in this notch. The latch bar carries a projecting pin 136d extending outside of the sweep or ambit of the operating rod 124d. However, when slide bar 132 is shifted to the left as shown in Figure 14, the lower edge of latch bar 133 rides up the sloping edge of the V groove 135 until it rests on the top of slide bar 132. In this position, when operating rod 124d is turned counterclockwise, it engages projecting pin 136d.

The shoe 130 has a flexible connector 137d, such as a chain, connected to pin 134, which passes around pulleys 138, 139 and 140 (Fig. 6) suitably carried by the frame and partition of the machine. Thus, it will be seen, that when shoe 130 is shifted to the right by counterclockwise rotation of the operating rod 124d, the chain 137 attached to the shoe retracts measuring piston 45 of measuring unit 37d. When slide bar 132 is at its extreme right position, as shown in Figure 12, the actuating rod 124d cannot engage pin 136d, and therefore, in this position, the crank 122d cannot operate its powder dispenser 37d. Actuating pins 124c and 124b operate in a similar manner through latch bars 141 and 142 and chains 137c and 137b respectively to retract the measuring pistons of powder dispensers 37c and 37b respectively.

A lower bar 143 carries a slide bar 144, similar to slide bar 132, which has V notches similar to V notch 135, to cooperate with similar latch bars. Thus, the operating pins 124e and 124a operate in a similar manner through chains 137e and 137a to retract the measuring pistons of powder dispensers 37e and 37a respectively. Slide bar 144 carries a pin 144′ which is in position to be engaged by crank pin 125 upon turning of crank 123. The slide bars 132 and 144 are rigidly secured together by a vertical bar 145 that extends down through a suitable slot in partition 13. This bar has attached thereto the end of link 105 (Fig. 5) so that movement of bar 145 to the left accomplishes four functions: it moves the various locking pins 83a to 83e to release the various pawls 67; by moving link 85, the valve 11 is turned to fill the measuring chamber 24; through link 96 and pin 99, the cup dispenser 7 is actuated to drop a cup into position; and the various latch bars 133, etc., are positioned to respond to operation of the various crank pins 124a to 124e. This movement of bar 145 is accomplished by the coin-controlled mechanism, as will now be described.

*Coin control mechanism*

The coin-controlled mechanism is indicated generally at 146 (Fig. 13) and is of conventional type. It includes a slide bar 147 that contains a recess (not shown) to receive a coin, and a pawl that prevents the slide bar from being pushed in fully unless a coin is in the recess. Referring to Figs. 5 and 7, a lever 148 is pivoted at 149 to the under face of partition 13, this lever having a downwardly offset angular extension 150. The end 151 of lever 148 engages behind vertical bar 145. The inner end of slide bar 147 carries a cross bar 152 (Figs. 5 and 11) with a forward extension 153 on which is located an upwardly extending finger 154. When the coin slide bar 147 is pushed inward with a coin therein (upwardly, as shown in Figures 5 and 7), the finger 154 engages offset extension 150, so as to pivot lever 148 clockwise and its end 151 pushes bar 145 to the left, to set the machine for operation.

*Empty cup dispenser interlock*

The machine embodies an arrangement to prevent operation should the supply of cups be exhausted. Referring to Fig. 11, the coin slide 147 carries a boss 157 on its under face. The housing of the coin mechanism carries a bracket 158 that provides a bearing for a vertically slidable pin 159, a stop lug 160 being provided on the pin to limit its downward movement. This pin carries a disc 161 at its lower end. When the pin 159 is raised to its dot and dash line position, it will be engaged by boss 157 when the coin slide bar 147 is pushed inward (to the right) and thus will prevent the slide bar being pushed in far enough to discharge the coin or operate the unlocking apparatus.

Figure 19:
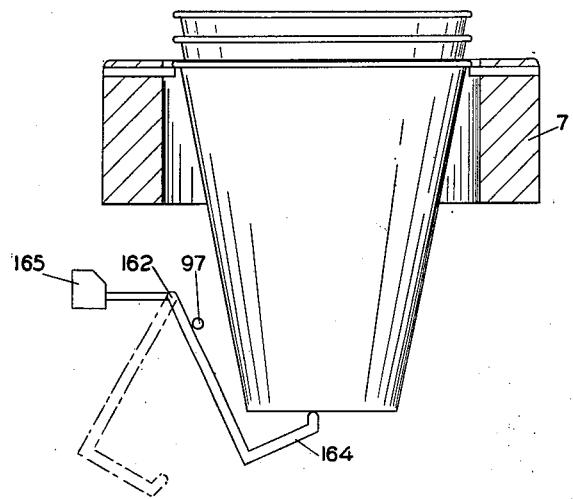
Figure 19 is a partly diagrammatic view of the cup operated interlock.

Referring to Figure 5, a wire or rod 162 suitably journalled for rotation about its axis, has a bent end 163 positioned to engage the bottom face of disc 161. Its other end is bent into a hook 164 (Figs. 5 and 19) that is positioned to project into the path of the cups in the dispenser. A counterweight 165 attached to rod 162 tends to rotate this rod in the direction so that hook 164 engages against the bottom of the lowermost cup in the stack. The engagement of the hook with the cup bottom thus limits turning of rod 162 so that the end 163 cannot engage disc 161, and thus, cannot push pin 159 into the path of boss 157. However, should the cup stack be exhausted, there is no cup to limit turning of rod 162 by the counterweight, so end 163 engages disc 161 to raise pin 159 into the path of boss 157, and thus prevents operation of the coin slide bar. The wire 97 on link 96 lies adjacent hook 164. When link 96 moves to operate the cup dispenser, the wire 97 engages hook 164 to turn it out of the path of the cup, so that when a cup is released, it can drop without interference by hook 164.

*Ventilator actuator*

An electrical timer 166 is attached to the underside of partition 13 adjacent the coin-control mechanism. This timer is of conventional construction and has an actuating arm 167 by which its operation is started. The coin slide 147 has an upwardly projecting pin 168 located to engage arm 167 when the coin slide is pushed in the whole way. Timer 166 energizes an electrical circuit (not shown) connected to heater 35 (Fig. 6) in stack 34, so that when the coin slide is operated this heater is turned on to produce an upward draft in the stack to draw out vapor. The timer automatically cuts off the heater after a predetermined time of operation. When the heater comprises an electric light bulb, as indicated in Fig. 6, the illumination furnished by that bulb serves to light the space about the mixing cup being filled. In addition it serves as a display light illuminating the cover 2 after the cup is removed and while the timer is still operating.

*Operation*

In the normal or inoperative position the valve 11 is as shown in Figure 2; the pawl release links are as shown in Figure 5; and the plungers 45 are as shown in Figures 6 and 10. The operation of the machine is initiated by placing a coin in coin slide 147 and pushing this slide in the whole way. If the stack of cups are depleted, the counterweight 165 (Fig. 5) rotates rod 162 so as to cause arm 163 to push up disc 161 (Fig. 11) to interpose rod 159 in the path of boss 157 to prevent the coin slide being pushed in far enough to operate the machine or drop the coin.

However, assuming there is a cup in the dispenser, the operation of slide 147 shifts cross bar 152 (Figs. 5 and 7) extension bar 153 and finger 154, and the latter engages extension 150 to shift lever 148 clockwise. The end 151 of lever 148 thus shifts vertical bar 145 to the left to shift link 105 to the left. This movement of link 105 acts, through bell crank 102 and link 104 to rotate arm 81a about pivot 82, thus shifting locking pin 83a to release pawl tail 68a. Links 84, 85, 86 and dog leg link 91 similarly rotate arms 81b, 81c, 81d and 81e to release their respective pawls. The released position of pawl tail 68c is shown in Fig. 10, the release of the tail allowing pawl 67 to engage rack 66 on the plunger 45 of powder feeder 37c. At the same time the respective pawls of all the other powder feeders 37a to 37e act in the same way. It will be seen the pawl 67 will allow movement of the plunger 45 to the right, but locks the plunger against movement to the left. The above described operation sets the respective powder dispensing mechanisms 37a to 37e ready for manual selection.

The shifting of link 85 (Fig. 5) to the left causes pin 115 to rotate lever 111 so as to shift valve 11 from the position shown in Figure 3 to that shown in Figure 2. In this position water flows from storage tank 8 to fill measuring tank 24, the liquid finding its own level.

The shifting of link 96 moves wire 97 to engage hook 164 to move it out from under the lowermost cup, and the end 101 engages and shifts the cup dispenser actuating pin 99 so as to release a single cup. This cup drops through opening 93 in partition 13, into chute 108, and slides down the chute into compartment 3. The bottom portion of the cup enters between baffles 109, 110, and when the bottom edge hits grille 30, the cup tends to right itself. Baffle 109 prevents the cup top tilting too far to the right, and baffle 110 prevents the bottom sliding to the left, so the cup is constrained to assume an upright position under opening 36 through which powder and water are discharged into the cup. There is sufficient time delay so that by the time the operator has made his selection, as described below, the water measuring chamber 24 is filled.

The operator now makes his selection by turning the selected crank 122a to 122e (Fig. 13) on the front panel of the machine. If either soup, chocolate or black, unsweetened coffee are selected, the cranks 122d, 122e or 122b are turned till they engage the respective stops 119. However, if coffee with cream and sugar are desired, the operator turns the coffee crank 122b the whole way, then turns the cream crank 122c and sugar crank 122a the required amount to select the quantity desired. It is to be understood, the various ingredients are in powder form.

Referring to Figure 5, the shifting of rod 145 to the left (see Fig. 12) shifts slide bars 132 and 144 attached thereto to the left. This causes all the latch bars 133a to 133e to rise out of their respective V notches 135a to 135e and bring the respective pins 136a to 136e within the ambit of the respective actuator cranks 124a to 124e. Assuming the operator wants coffee, he turns crank 122b (Fig. 13) clockwise until it engages stop 119. He then turns cream crank 122c and sugar crank 122a. For convenience, graduation marks are on the machine to allow the operator to select the quantity of sugar he desires, and similar graduation marks may be provided for the cream crank. When crank 122b is turned, the operating pin or crank 124b (Fig. 12) engages pin 136b on latch bar 142, shifting it to the right and through chains 137b attached to pin 134b the plunger 45 of dispenser 37b is retracted to the right. Referring to Figure 10, the corresponding pawl 67 holds the plunger in the retracted position.

It will be seen that if a crank is not completely turned, its corresponding plunger will not be completely retracted. The retraction of a plunger 45 (Fig. 9) allows powder from bag 40 to drop into cylinder 38. If the plunger 45 is only partially retracted, the powder fills only the space not occupied by the plunger, so the amount of powder dispensed will be correspondingly reduced.

When a plunger 45 is retracted, it acts through chain 79 (Fig. 10) to lift piston 73 and weight 76 (Fig. 17), and the weight biases plunger 45 to the left, but the engagement of pawl 67 with rack 66 prevents return of the plunger. Thus, the dispenser is set or cocked to deliver the desired amount of powder.

The operator now turns crank 123, and this acts through arm 125 on pin 144' to shift slide bars 132, 144 and connecting bar 145 to the right. This allows the latches 133, 141, etc., to drop into their respective V notches, and places pins 136a to 136e out of reach of the respective cranks, so the machine is locked against further selection. The shifting of connecting bar 145, moves link 105 (Fig. 5) to the right causing the relocking of pawl tails 68a to 68e, so all pawls 67 are released. At the same time the shifting of link 85 rotates valve 11 from the position shown in Fig. 2 to the position shown in Figure 3. The release of the pawls 67 allows all the plungers 45 that had been displaced to move slowly to the left under the influence of the weights 76, so they push powder out of cylinders 48. The powder drops through opening 36 into the mixing cup and since the powder is in unagglomerated form, due to the disturbance in flexible bag 40, it falls in flaky condition upon the surface of the turbulent water dropping into the mixing cup. Simultaneously therewith, the flow of water from tank 24 to storage tank 14 causes hot water to overflow through pipe 18, 19 into the cup. The timing, due to the distance the plunger must travel before it starts to dispense powder through opening 51, is such that the discharge of hot water is begun before the powder enters the cup, so as to avoid agglomeration of powder in the cup. The simultaneous falling of hot water and powder mixes them in the cup.

I claim as my invention:

1. In a beverage dispenser: a hot water storage tank; an overflow discharge conduit extending therefrom; a cold water storage tank above the hot water storage tank; a measuring chamber below the water level of the cold water storage tank; conduit means including valve means adapted to connect said measuring chamber with said cold water storage tank and hot water storage tank, said valve means in one position allowing flow from the cold water storage tank to said measuring chamber, and in another position allowing flow from the measuring chamber to said hot water storage tank to cause a corresponding quantity of water to escape through said overflow conduit; and means to operate said valve to said positions.

2. An apparatus as specified in claim 1 having: a surge chamber connected to said hot water storage tank to temporarily receive overflow in the hot water storage tank.

3. An apparatus as specified in claim 1 wherein: said latter means includes coin control apparatus.

4. Apparatus as specified in claim 3 having: a cup dispenser; and said coin control apparatus is connected to release a cup for receiving the overflow discharge from the overflow discharge conduit.

5. A beverage dispenser as specified in claim 4 having: powder dispensing means arranged to discharge powder into said cup; and a manually actuated means placed in operative condition by said coin controlled means for dispensing powder into said cup.

6. An apparatus as specified in claim 2 wherein: said overflow discharge conduit has a one way valve therein allowing flow in discharge direction.

7. An apparatus as specified in claim 1 having: coin controlled means for positioning a cup to receive the overflow discharge from said overflow discharge conduit.

8. In a beverage dispenser: a powder measuring chamber mounted upon a support having an aperture therein; a measuring piston operable in said measuring chamber; manually operated means, maintained normally in inoperative condition for retracting said measuring piston; means biasing said piston from retracted position to discharge powder from the measuring chamber through said aperture and into a cup located beneath said aperture; coin operated means rendering said manually operated means effective to retract said piston; and means operated by said coin operated means to position a cup directly beneath said aperture to receive discharged powder freely dropping from the measuring chamber.

9. An apparatus as specified in claim 8 having: a reservoir having a flexible wall for supplying powder to said measuring chamber; an agitator biased to engage said flexible wall; and means actuated with said piston to move said agitator against the bias; and means to release the agitator to cause the agitator to strike said reservoir.

10. In a beverage dispenser: powder measuring means having a powder receiving and powder discharging position; water measuring means adapted to receive and discharge a predetermined quantity of water; a manually operated means for operating said powder measuring means to receiving position, including connector means having an operative and normally inoperative condition, and serving, in operative condition to connect the manually operated means to the powder measuring means; coin controlled means for actuating said water measuring means to receive water, and for adjusting said connector means to operative condition; and a second manually operated means for operating said water and powder measuring means to discharge position, and for returning said connector means to inoperative condition.

11. Apparatus as specified in claim 10 having: means for locking said powder measuring means in receiving position; means for moving said powder measuring means from receiving to discharging position; and means operated by said second manually operated means to release said locking means.

12. An apparatus as specified in claim 10 having: cup dispensing means operated by said coin controlled means to position a cup to receive the discharge from the powder and water measuring means.

13. In a beverage dispenser: a plurality of powder measuring means; a plurality of manually operated selector means, each being adapted to operate a corresponding powder measuring means, and including connector means having an operative and normally inoperative condition, said connector means serving, in operative condition, to connect the selector means to the respective powder measuring means; coin controlled means for adjusting said connector means to operative condition; and a second manually operated means for returning said connector means to inoperative condition.

14. A beverage dispenser as specified in claim 13 wherein: said powder measuring means each has a powder receiving and powder discharging position; means is provided for holding said powder measuring means in powder receiving position; and said second manually operated means also releases said holding means to allow the measuring means to move to powder discharging position.

15. An apparatus as specified in claim 13 having: water measuring means adapted to receive and discharge a predetermined quantity of water; means actuated by said coin controlled means for filling said water measuring means, said latter means being actuated by said second manually operated means for discharging water.

16. An apparatus as specified in claim 13 having: cup dispensing means operated by said coin controlled means to position a cup to receive the discharge from the powder and water measuring means.

17. An apparatus as specified in claim 13 wherein: the water measuring means comprises: a hot water storage tank; an overflow discharge conduit extending therefrom; a cold water storage tank above the hot water storage tank; a measuring chamber; conduit means including valve means adapted to connect said measuring chamber with said cold water storage tank and with said hot water storage tank, said valve means in one position allowing flow from the cold water storage tank to said measuring chamber, and in another position allowing flow from the measuring chamber to said hot water storage tank to cause a corresponding quantity of water to escape through said overflow conduit; said means actuated by the coin controlled means being said valve means.

18. A powder measuring mechanism comprising: a measuring chamber; a measuring piston axially movable in said chamber; a reservoir having a flexible wall connected to discharge powder into said measuring chamber and having a bottom sleeve portion receiving the measuring chamber and circumferentially surrounding the same; an agitator biased to engage said flexible wall; and means actuated with said measuring piston to move said agitator against the bais; and means to release the agitator to cause the agitator to strike said reservoir.

19. In a dispensing mechanism: a reservoir for powder comprising a pliable bag; a measuring chamber extending through the bottom of said bag and having an opening therein through which powder from the bag enters said bag having a bottom sleeve portion receiving the measuring chamber and circumferentially surrounding the same; and means axially movable in said measuring chamber to discharge powder from the measuring chamber.

20. In a beverage dispenser: a cabinet; a compartment in said cabinet; means for positioning a mixing cup in said compartment; said compartment having an opening in the top; a hot water supply tank in said cabinet; means for discharging hot water through said opening directly into said mixing cup prior to and during the discharge of powder thereinto; powder dispensing means arranged to discharge powder through said opening directly into said mixing cup subsequent to the initial discharge of water thereinto; a stack in said cabinet; and a heater in said stack to promote a draft therein for purging water vapor from the cabinet.

21. A hot beverage dispenser comprising in combination, a cabinet, a compartment in said cabinet accessible from the exterior thereof, means for positioning a removable mixing cup in said compartment, a supply of hot water in said cabinet, means for discharging hot water from said supply into said cup, a supply of powdered beverage ingredient in said cabinet, means for discharging said ingredient into said cup, said water and ingredient remaining unmixed with each other prior to entry into said mixing cup, and means for actuating said water discharging means and said ingredient discharging means in overlapping sequence thereby to permit water to flow into said cup prior to and during discharge of said ingredient thereinto, whereby efficient mixing is promoted within said cup.

22. A hot beverage dispenser comprising in combination, a cabinet, a compartment in said cabinet accessible from the exterior thereof, means for positioning a removable mixing cup in said compartment, a supply of hot water in said cabinet, means for discharging hot water from said supply into said cup, a flexible container in said cabinet containing a supply of powdered beverage ingredient, means for discharging said ingredient in a readily dispersible state into said cup for mixing with hot water contained therein, means for maintaining said supply of ingredient in a dispersible state, said water and ingredient remaining unmixed with each other prior to entry into said mixing cup, and means for actuating said water discharging means and said ingredient discharging means in overlapping sequence thereby to permit water to flow into said cup prior to and during discharge of said dispersible ingredient thereinto, whereby efficient mixing is promoted within said cup.

23. A hot beverage dispenser comprising in combination, a cabinet, a compartment in said cabinet accessible from the exterior thereof, means for positioning a removable mixing cup in said compartment, a supply of hot water in said cabinet, means for discharging hot water from said supply into said cup, a plurality of flexible containers in said cabinet, each container enclosing a separate supply of powdered beverage ingredient and having a separate means for discharging the ingredient in a readily dispersible state into said cup, a separate means associated with each container for maintaining the supply of ingredient therein in a dispersible state, said water and ingredients remaining unmixed with each other prior to entry into said mixing cup, means for selectively adjusting the separate means for discharging said ingredients thereby to provide a selection between full discharge, partial discharge and no discharge of each of said ingredients and means for actuating said water discharging means and said selectively adjusted ingredient discharging means in overlapping sequence, thereby to permit water to flow into said cup prior to and during discharge of a mixture of said dispersible ingredients thereinto, whereby efficient mixing is promoted within said cup.

References Cited in the file of this patent

UNITED STATES PATENTS

| | | |
|---|---|---|
| 1,090,120 | Scott | Mar. 10, 1914 |
| 2,029,460 | Brady | Feb. 4, 1936 |
| 2,614,738 | Mills | Oct. 21, 1952 |
| 2,676,733 | Lober | Apr. 27, 1954 |